(12) United States Patent
Secretin (10) Patent No.: US 11,405,995 B2
(45) Date of Patent: Aug. 2, 2022

(54) LUMINAIRE DRIVER

(71) Applicant: SCHREDER S.A., Brussels (BE)

(72) Inventor: Laurent Secretin, Remicourt (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/279,823

(22) PCT Filed: Sep. 19, 2019

(86) PCT No.: PCT/EP2019/075119
§ 371 (c)(1),
(2) Date: Mar. 25, 2021

(87) PCT Pub. No.: WO2020/064487
PCT Pub. Date: Apr. 2, 2020

(65) Prior Publication Data
US 2022/0039235 A1 Feb. 3, 2022

(30) Foreign Application Priority Data

Sep. 25, 2018 (NL) ..................................... 2021706

(51) Int. Cl.
*H05B 45/3725* (2020.01)
*F21V 23/00* (2015.01)
(Continued)

(52) U.S. Cl.
CPC ....... *H05B 45/3725* (2020.01); *F21V 23/009* (2013.01); *H01H 83/10* (2013.01); *H02H 9/04* (2013.01)

(58) Field of Classification Search
CPC .. H05B 45/3725; F21V 23/009; H01H 83/10; H02H 9/04
See application file for complete search history.

(56) References Cited

U.S. PATENT DOCUMENTS 9,872,360 B2 * 1/2018 Xu .................. F21V 23/009
2010/0127625 A1 * 5/2010 Minarczyk ........... H05B 41/292
315/119
(Continued)

FOREIGN PATENT DOCUMENTS

EP 3024302 A1 5/2016

OTHER PUBLICATIONS

PCT International Search Report and Written Opinion, PCT Application No. PCT/EP2019/075119, dated Nov. 12, 2019, 9 pages.

*Primary Examiner* — Renan Luque
(74) *Attorney, Agent, or Firm* — McDonnell Boehnen Hulbert & Berghoff LLP (57) ABSTRACT

Example embodiments relate to improved luminaire drivers. One embodiment includes a luminaire driver for driving a light module of a luminaire. The luminaire driver includes a driver housing. The driver housing includes a first and second power supply input connector element, for connection to an electrical distribution grid. The driver housing also includes output connector elements for connection to the light module. The luminaire driver also includes a driver circuitry arranged inside the driver housing, between the first and second power supply input connector elements and the output connector elements. The driver housing is provided with an equipotential connecting part available at an external surface of said driver housing and intended for being connected to an equipotential part of the luminaire. The luminaire driver further includes a resistive circuitry arranged inside the driver housing and connected between the equipotential connecting part and the first power supply input connector element.

20 Claims, 6 Drawing Sheets

(51) Int. Cl.
*H01H 83/10* (2006.01)
*H02H 9/04* (2006.01)

(56) References Cited

U.S. PATENT DOCUMENTS

| | | | |
|---|---|---|---|
| 2014/0042908 A1* | 2/2014 | Mercier | H05B 45/50 |
| | | | 315/125 |
| 2014/0168833 A1* | 6/2014 | Sesink | H02H 9/042 |
| | | | 361/56 |
| 2016/0150606 A1* | 5/2016 | Borlez | H05B 45/50 |
| | | | 315/121 |
| 2016/0204600 A1* | 7/2016 | Muehlschlegel | H02H 9/043 |
| | | | 315/125 |
| 2016/0234900 A1* | 8/2016 | Bendtsen | H05B 45/3725 |
| 2017/0122545 A1* | 5/2017 | Chen | F21V 19/002 |

* cited by examiner

LUMINAIRE DRIVER

CROSS-REFERENCE TO RELATED APPLICATIONS

The present application is a national stage entry of PCT/EP2019/075119 filed Sep. 19, 2019, which claims priority to NL 2021706 filed Sep. 25, 2018, the contents of each of which are hereby incorporated by reference.

FIELD OF INVENTION

The invention relates to a luminaire driver for driving a light module which is arranged in a luminaire housing, and to a luminaire comprising such a luminaire driver.

BACKGROUND

Luminaire systems, in particular outdoor luminaire systems, comprise a luminaire housing in which a light module with a plurality of light sources is arranged. A luminaire system may provide an electrical path to earth, either intentional (e.g. with an earth wire) or unintentional (e.g. with a metal pole buried to ground). However, when there is no such electrical path to earth (e.g. in case of concrete/wood pole, in case of a luminaire fixed to a wall, or in case of a luminaire housing which is partially or totally made of a non-conductive material), the luminaire housing (also called enclosure) and/or the heat sink is isolated from the earth, unless special measures are taken.

In some systems, the luminaire housing may be made partly or fully of metal, and the metal part of the luminaire housing may function as a heat sink. In other systems, the luminaire housing and the heat sink may be separate components. If the luminaire housing is made of a non-conductive material, charges may accumulate on the housing, and may pass from the non-conductive luminaire housing to the heat sink.

For example, a luminaire system may comprise a luminaire pole and a luminaire head formed by the luminaire housing. In other luminaire systems, the luminaire head may be connected to a wall. When the luminaire housing and/or the heat sink is electrically isolated from the earth, electrostatic charges may accumulate on the luminaire housing and/or on the heat sink, e.g. caused by wind, neighboring power lines, etc. Typically electrostatic charges try to find an electrical path to earth. In an example where the luminaire housing and/or the heat sink is partially/totally insulated from earth, charges will accumulate until they achieve a critical level that can bridge over an insulation layer to go back to earth through a neutral line of the electrical distribution grid, as the luminaire system does not provide a direct electrical path to earth. The insulation layer may be an insulation layer between the luminaire housing and the at least one light source and/or between the heat sink and the at least one light source. When the amount of accumulated electrostatic charges increases above the critical level that can bridge over the insulation layer, the electrical insulation layer may be damaged, resulting in damage of the light sources and/or of other components of the luminaire system.

Further, a lamp pole or post may be made of an electrically non-conductive material or of an electrically conductive material. Also, as described in WO 2014/029772 in the name of the applicant, in some systems a reinforced isolating member may be provided in the electrical path from the mains power supply to the ground. When a lamp pole is made of an electrically conductive material, typically the pole provides an electrical path between the earth and the luminaire housing so that electrostatic charges cannot accumulate on the luminaire housing. However, when a lamp pole is made of non-conductive material or if the luminaire housing is partially/totally made of non-conductive material, electrostatic charge may accumulate due to absence of a direct electrical path between the luminaire housing and the earth.

To avoid the above stated problems, according to existing solutions, the luminaire housing may be connected to an earth. However this requires additional wiring, as an earth connection is sometimes not available in the luminaire system, i.e. in such situations neither the luminaire housing, nor the feeding cable is provided with an earth connection.

US 2016/0204600 discloses an overvoltage protection apparatus arranged in luminaire head outside of the driver housing.

US 2017/024341 and US 2010/0127625 disclose a led driving devices with surge protection circuitry.

SUMMARY

The object of embodiments of the present invention is to provide a luminaire driver for driving a light module, which is capable of dealing with electrostatic charges accumulating on the luminaire housing, and which is especially suitable for luminaire systems where an electrical path to earth is not available near the luminaire housing.

According to a first aspect of the invention there is provided a luminaire driver for driving a light module of a luminaire. The luminaire driver comprises a driver housing with a first and second power supply input connector element for establishing a connection to a distribution grid and with output connector elements for establishing a connection to the light module. The luminaire driver further comprises a driver circuitry arranged inside the driver housing. The driver circuitry is arranged between the first and second power supply input connector elements, and the output connector elements. The driver housing is further provided with an equipotential connecting part available at an external surface of the driver housing and intended for being connected, directly or indirectly, to an equipotential part of the luminaire, such as a portion of a luminaire housing and/or heat sink. The luminaire driver comprises a resistive circuitry arranged inside the driver housing and connected between the equipotential connecting part and the first power supply input connector element, such that a resistive path is created between the equipotential connecting part and the first power supply input connector element.

When using such a luminaire driver, the equipotential connecting part thereof can be connected to the equipotential part of the luminaire, such that a resistive electrical path is created between the equipotential part of the luminaire and the first power supply input connector element through the resistive circuitry. The first power supply input connector element can be connected to the neutral line, and the second power supply input connector element can be connected to the voltage line of the electrical distribution grid. The resistive circuitry present between the equipotential part and the first power supply input connector element allows a small current (an intentional leakage current) to flow from the equipotential part of the luminaire to the neutral line of the electrical distribution grid. Thus, when electrostatic charges accumulate on the equipotential part of the luminaire, those charges can leak towards the earth through the neutral line thanks to the resistive circuitry. By including such resistive circuitry in the luminaire driver, the risk of accumulating electrostatic charge to a critical level so that an electrostatic discharge (ESD) can happen through an insulation layer and damage semiconductor components such as LEDs, is reduced, without the need for a separate connection of the luminaire housing and/or heat sink to the earth. The luminaire housing and/or the heat sink may be simply connected, directly or indirectly, to the equipotential connecting part during installation of the luminaire driver. For example, the equipotential connecting part may be connected directly to an electrically conductive portion of the luminaire housing and/or of the heat sink.

In a preferred embodiment, the driver circuitry comprises a voltage-to-current converter circuitry configured to provide a drive current at the output connector elements of the luminaire driver. Such converter circuitry is preferred when the light module comprises light emitting diodes. In that manner, a plurality of light emitting diodes connected in series can be easily provided with a drive current. In alternative embodiments, a voltage-to-voltage converter may be used.

In preferred embodiments the resistive circuitry has an equivalent resistance value between $1M\Omega$ and $100M\Omega$, preferably between $1.5M\Omega$ and $10M\Omega$. The resistive circuitry may comprise one or more resistive components. The one or more resistive components may be one or more resistors but may also include one or more other resistive components such as semiconductor components.

The resistive circuitry is chosen such that the amount of electrostatic charges on the equipotential part of the luminaire cannot increase too rapidly. Values in the above mentioned range are suitable for achieving this goal. Typically, the equivalent resistance value has to be low enough to prevent electrostatic charge accumulation above a critical level (as explained above), while being high enough to prevent electrical safety concerns related to the bridging of an insulation barrier between the electrical distribution grid and the accessible equipotential part of the luminaire. If the driver housing is made of an electrically non-conductive material, e.g. plastic, the insulation barrier may comprise the electrically non-conductive material of the driver housing. Additionally or alternatively, the insulation barrier may comprise an insulation sheet arranged around the driver circuitry. Preferably, the resistive circuitry has an equivalent resistance value in the above mentioned range within a predetermined frequency range, wherein the predetermined frequency range may be from 0 Hz to 100 kHz, or even from 0 Hz to 1 GHz. In other words, the resistive circuitry may provide a high electrical resistivity over a frequency range from direct current to high frequency alternative current or transient.

In a preferred embodiment, the resistive circuitry comprises at least one resistor. Resistors have the advantage of being robust, cheap, and easy to integrate into the luminaire driver. More preferably, the resistive circuitry comprises at least two resistors connected in series. In that manner, in case one resistor is failing in short circuit, the second one can still protect against an electric shock.

Preferably, the resistive circuitry is configured such that a safe failure mode is secured. For example, the resistive circuitry may be configured such that an open circuit is created when the resistive circuitry breaks down. For security reasons such types of resistive circuitry are preferred.

In an exemplary embodiment, the driver housing further contains a switching element and a control means for controlling the switching element, wherein the switching element is connected in series with the resistive circuitry, between the equipotential connecting part and the first power supply input connector element. In that manner, the resistive circuitry may be "activated" by the control means as needed, e.g. the resistive circuitry may be "activated" only when it is known that there is a risk of electrostatic discharge and there is no electrical path to earth. The control means may be configured to receive an external control signal, e.g. a wireless or wired signal, and to control the opening and closing of the switching element accordingly.

According to a further developed embodiment, the driver housing further contains a branch with a second resistive circuitry and a second switching element connected in series with the second resistive circuitry, wherein the branch is connected between the equipotential connecting part and the first power supply input connector element. The control means is then further configured to control the second switching element. The second resistive circuitry may have an equivalent resistance value which is different from the equivalent resistance value of the first resistive circuitry. In that manner, using the switching elements, it may be decided to use either the first resistive circuitry, or the second resistive circuitry, or the first and second resistive circuitry connected in parallel. Depending on the properties of the luminaire system and/or the environment, the first and second switching element may be controlled to set a suitable resistance.

In an exemplary embodiment, the luminaire driver further comprises a capacitor arranged inside the driver housing and connected to the equipotential connecting part. Such capacitor may result in a luminaire driver which fulfills typical electromagnetic compatibility (EMC) requirements.

In an exemplary embodiment, the driver housing is at least partially made of metal, and the equipotential connecting part is formed by the metal of the driver housing. In other possible embodiments the driver housing may be made of an electrically insulating material such as plastic, and the equipotential connecting part may be integrated in the driver housing. For example, the equipotential connecting part may be any one of the following: a connection wire, a connector plug, a connector pin, a connector socket, a terminal block, etc. Such equipotential connecting parts allow for a convenient connection to the equipotential part of the luminaire.

In an exemplary embodiment, the driver circuitry comprises a rectifier circuitry and a power switching converter circuitry, wherein the power switching converter circuitry is arranged downstream of the rectifier circuitry when looking from the first and second power supply input connector elements towards the output connector elements. The resistive circuitry may be connected to a branch between the first power supply input connector element and the rectifier circuitry. Alternatively, the resistive circuitry may be connected to a branch between the rectifier circuitry and the power switching converter circuitry. Preferably the power switching converter circuitry comprises a galvanic insulation between a primary side and a secondary side thereof. The power switching converter circuitry may comprise e.g. a flyback converter, a buck converter, a boost converter, etc.

According to an exemplary embodiment, the driver housing further contains an additional resistive circuitry connected between the equipotential connecting part and the second power supply input connector element. The additional resistive circuitry may be identical or similar to the above described resistive circuitry. Such an embodiment has the advantage that the neutral line of the electrical distribution grid may be connected either to the first power supply input connector element or to the second power supply input connector element. This makes the installation by an operator easier as he can connect the first and second power supply input connector elements to the electrical distribution grid in any manner, and does not have to pay attention to connect the first power supply input connector element to the neutral line and the second power supply input connector element to the voltage line as the connection can be done either way.

In an exemplary embodiment, the driver circuitry and the resistive circuitry are provided on a circuit board arranged in the luminaire driver housing. This results in a compact and easy to manufacture luminaire driver.

According to an exemplary embodiment, the driver housing is provided with an externally accessible receiving means configured for receiving a pluggable module comprising a further circuit. Optionally the resistive circuitry may be included in the further circuit. In other words, the resistive circuitry may be added to the driver via the pluggable module. The receiving means will then be configured such that the resistive circuitry is connected between the equipotential connecting part and the first power supply input connector element. Optionally, a switching element and a control means for controlling the switching element may be included in the further circuit, wherein the switching element is connected in series with the resistive circuitry, between the equipotential connecting part and the first power supply input connector element, when the pluggable module is received in the receiving means. Optionally the driver housing may be provided with at least one, preferably externally accessible, control connector element connected to the further circuit of the pluggable module, when the pluggable module is plugged in the receiving means, so that a control signal can be communicated to the control means to control the switching element.

The further circuit may comprise circuitry allowing the luminaire driver to communicate using one or more protocols such as Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), an analogue communication protocol such as an analog 4-20 mA current loop protocol used for electronic signaling.

Also other additional circuitry may be included in the further circuit, such as surge protection circuitry. When surge protection circuitry is added, the receiving means may be provided with a connection interface connecting the driver circuitry via the surge protection circuitry to the first and second supply input connector elements, and optionally to the equipotential connecting part, when the pluggable module is plugged in the receiving means.

Optionally, the receiving means is such that the further circuit is connected to the driver circuitry when the pluggable module is plugged in the receiving means. Optionally the driver housing may be provided with at least one, preferably externally accessible, control input and/or output connector element connected to the further circuit of the pluggable module, when the pluggable module is plugged in the receiving means. The at least one externally accessible control input and/or output connector element may then be used to receive and/or send at least one further input and/or output signal using said one or more protocols. It is also possible to use a wireless protocol, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN), but this is generally not preferred. In such an embodiment the control input and/or output connector element may be omitted.

In an exemplary embodiment, the receiving means is configured to receive at least two different types of pluggable modules containing a different further circuit. For such an embodiment, an operator may decide to use either only one pluggable module or two pluggable modules, wherein, optionally, the two pluggable modules may be operational simultaneously. For example a first further circuit may be configured to allow the luminaire driver to communicate using a first protocol, whilst a second further circuit may allow the luminaire driver to communicate using the second protocol different from the first protocol. In other embodiments, the further circuit of a pluggable module may contain circuitry allowing the luminaire driver to communicate according to different protocols.

According to a second aspect of the invention there is provided a luminaire comprising a luminaire housing, a light module arranged in the luminaire housing, and a luminaire driver according to any one of the embodiments described above, wherein the equipotential connecting part is connected to, or in contact with, an equipotential part of the luminaire, and the light module is connected to the output connector elements. The equipotential part may be e.g. a portion of the luminaire housing or a heat sink of the luminaire.

According to an exemplary embodiment the luminaire driver is arranged in the luminaire housing. However, according to alternative exemplary embodiments the luminaire driver may be arranged on or near the luminaire housing.

According to an exemplary embodiment, the luminaire housing is at least partially made of an electrically conductive material such as metal and the equipotential connecting part is connected to, or in contact with, the electrically conductive material of the luminaire housing.

According to an exemplary embodiment, the luminaire further comprises a heat sink, and the equipotential connecting part is connected to or in contact with the heat sink.

BRIEF DESCRIPTION OF THE FIGURES

The accompanying drawings are used to illustrate presently preferred non-limiting exemplary embodiments of luminaire drivers and systems of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1A:
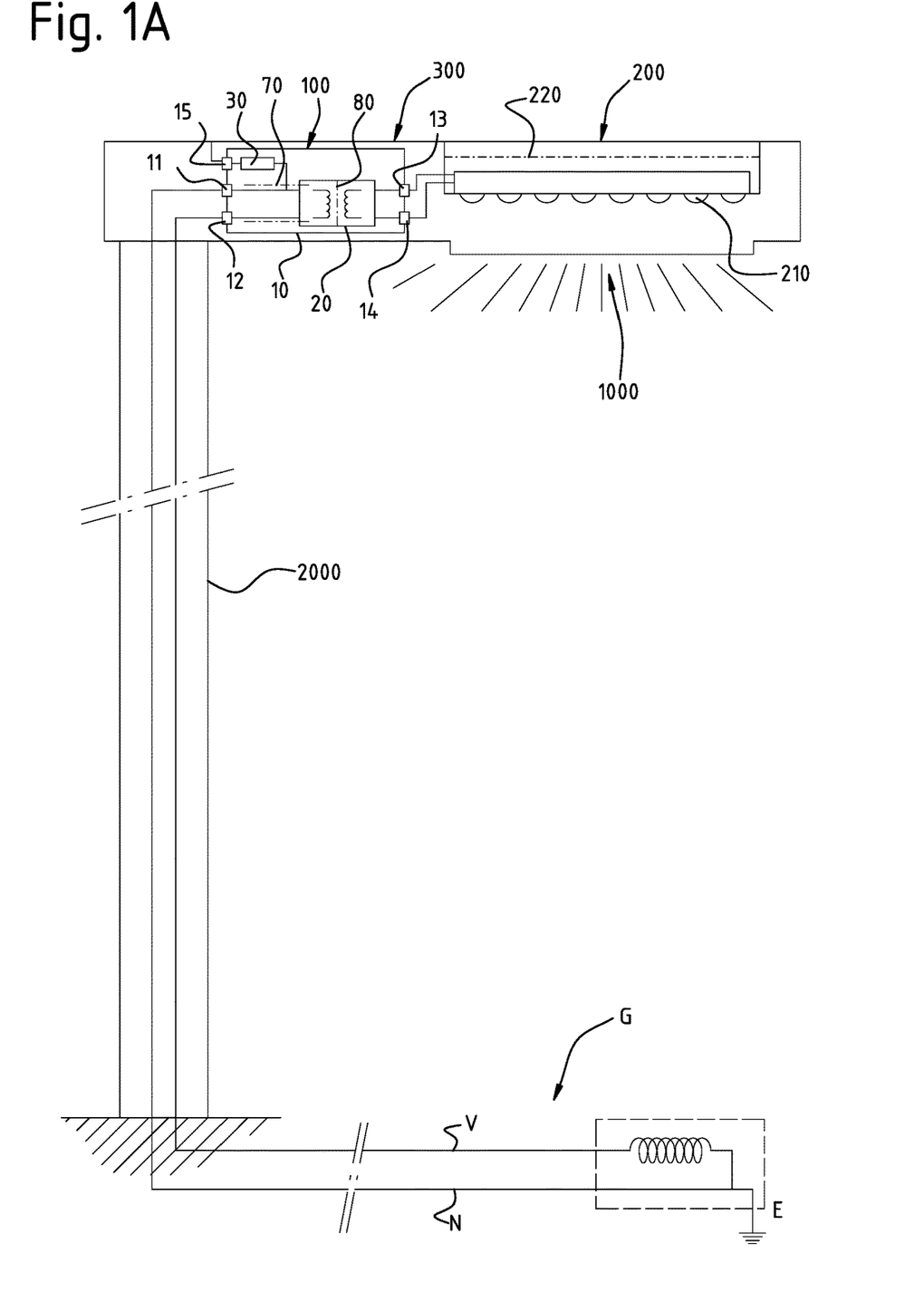
FIG. 1A is a schematic view of an exemplary embodiment of a luminaire.

FIG. 1A illustrates an exemplary embodiment of a luminaire according to the invention. The luminaire comprises a luminaire head 1000 and a luminaire pole 2000. The luminaire head 1000 may be connected in any manner known to the skilled person to the luminaire pole 2000. In other non-illustrated embodiments, a luminaire head 1000 may be connected to a wall or a surface, e.g. for illuminating buildings or tunnels. The luminaire head 1000 comprises a luminaire housing 300 in which a light module 200 is arranged. In this example it is assumed that the luminaire housing 300 comprises an electrically conductive equipotential part on which charges C can accumulate, see also FIGS. 1B and 1C. The light module 200 comprises a plurality of light sources 210, e.g. a plurality of light emitting diodes, and an insulation layer 220 configured to electrically insulate the so-called 'secondary circuit' including the plurality of light sources 210 and other non-illustrated electrical components, from the electrically conductive equipotential part of luminaire housing 300. This insulation layer 220 is shown schematically as a dotted line in FIGS. 1A-1D, and may be formed by a layer of a PCB on which the plurality of light sources 210 is mounted and/or by an additional layer inserted between the luminaire housing 300 (which functions in the illustrated embodiment as the heat sink) and the PCB.

Further, a luminaire driver 100 for driving the light module 200 is provided. The luminaire driver 100 typically includes a galvanic insulation 80 between the mains input circuitry (the so called 'primary circuit') and the secondary circuit including the plurality of light sources 210. The luminaire driver 100 typically also includes an insulation barrier 70 between the primary circuit and an equipotential connection part 15, see further. The luminaire driver 100 is shown to be arranged in the luminaire housing 300. However, in other embodiments the luminaire driver 100 may be arranged on the luminaire housing 300, on or in the luminaire pole 2000, or in any other location near the luminaire.

Figure 1B:
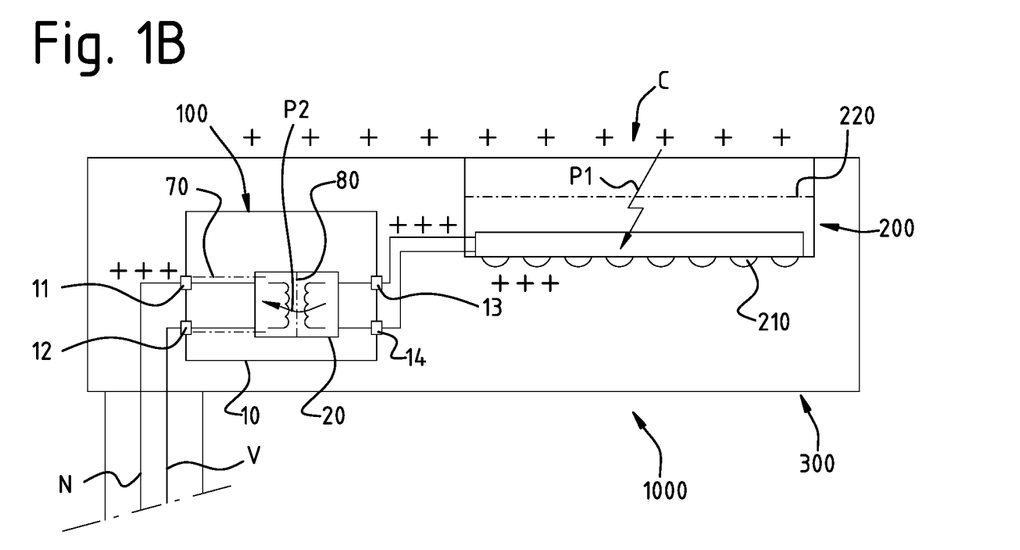
FIGS. 1B and 1C illustrate schematically how electrostatic charges may accumulate and leak towards earth in a situation without and with the resistive circuitry connected, respectively.

FIG. 1B illustrates schematically how electrostatic charges C may accumulate on the electrically conductive equipotential part of luminaire housing 300 until they reach a level that can bridge over the insulation layer 220, see arrow P1, so that they can discharge to earth E through the secondary and primary circuit, see arrow P2.

Figure 2:
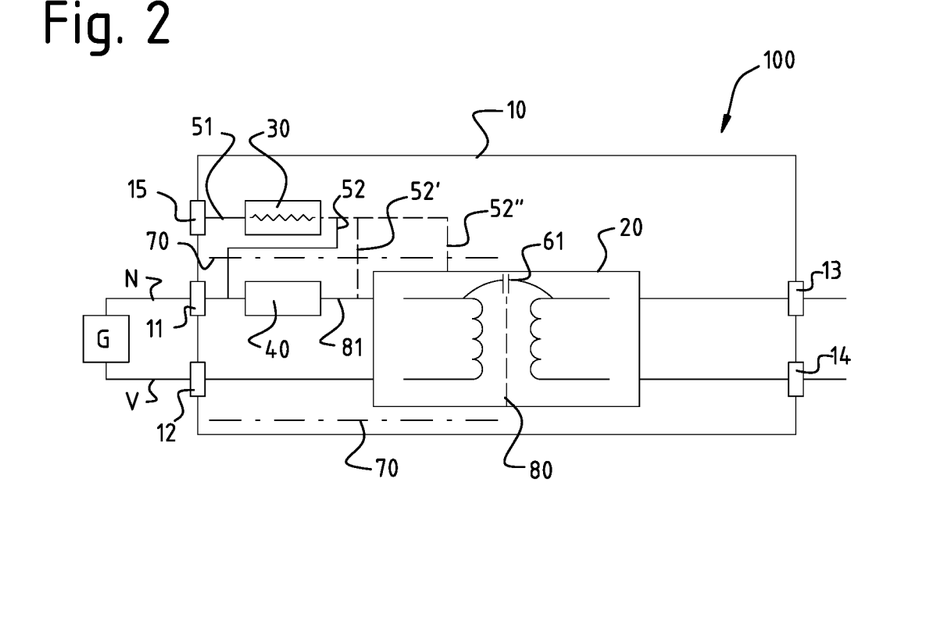
FIG. 2 is a schematic drawing of a first exemplary embodiment of a luminaire driver.

An exemplary embodiment of a luminaire driver is shown in FIG. 1A and FIG. 2. The luminaire driver 100 comprises a driver housing 10. The driver housing 10 is provided with a first and second power supply input connector element 11, 12 for connection to an electrical distribution grid G, and with output connectors 13, 14 for connection to the light module 200. A driver circuitry 20 is arranged inside the driver housing 10 and is configured for converting a voltage provided by the electrical distribution grid G into a suitable current or voltage for driving the light module 200. It is noted that the luminaire driver 100 may also be used to drive other components arranged in or on the luminaire head 1000 or near the luminaire head 1000, such as sensors, communication means, control means etc. The driver circuitry 20 may then be further configured to provide a suitable voltage or current to feed those other components. The driver circuitry 20 is arranged between the first and second power supply input connector elements 11, 12, and the output connector elements 13, 14. The converter circuit 20 may comprise the previously mentioned galvanic insulation 80 between primary and secondary circuit. Optionally, this galvanic insulation 80 may be bridged over by one or more capacitors 61 for EMC purposes, see FIG. 2. The one or more capacitors 61 may create a further path for electrostatic discharge in addition to the path P2 shown in FIG. 1B.

The driver housing 10 is further provided with an equipotential connecting part 15 which is available at an external surface of the driver housing 10, so that an operator can easily connect the equipotential connecting part 15 to the electrically conductive equipotential part of the luminaire housing 300. The equipotential connecting part 15 may also be called a functional earth connecting part. The driver 100 may comprise an insulation barrier 70 between the mains input circuitry (the primary circuit) and the equipotential connecting part 15. If the driver housing 10 is made of an electrically non-conductive material, e.g. plastic, the insulation barrier 70 may comprise the electrically non-conductive material of the driver housing. If the driver housing 10 is made of an electrically conductive material, the insulation barrier 70 may comprise an insulation sheet arranged around the driver circuitry 20. FIG. 1A and FIG. 2 show an equipotential connecting part 15 connected to the electrically conductive equipotential part of the luminaire housing 300. The luminaire driver 100 further comprises a resistive circuitry 30 arranged inside the driver housing 10 and connected between the equipotential connecting part 15 and the first power supply input connector element 11, bridging the insulation barrier 70. The resistive circuitry 30 is connected such that a resistive path is formed between the equipotential connector part 15 and the first power supply input connector 11. Optionally, a fuse 40 may be provided between the first power supply input connector 11 and the driver circuitry 20 as shown in FIG. 2. According to one possible embodiment, the resistive circuitry 30 may be connected directly between the equipotential connecting part 15 and the first power supply input connector element 11 as shown in FIG. 2 with line sections 51, 52. However, it is also possible to connect one end of the resistive circuitry 30 to the equipotential connecting part 15 and to connect the other end of the resistive circuitry 30 to an intermediate line section 81 between the first power supply input connector element 11 and the output connector elements 13, 14, as shown in FIG. 2 with line sections 52', 52", as long as a resistive path is formed between the equipotential connecting part 15 and the first power supply input connector element 11.

Figure 1C:
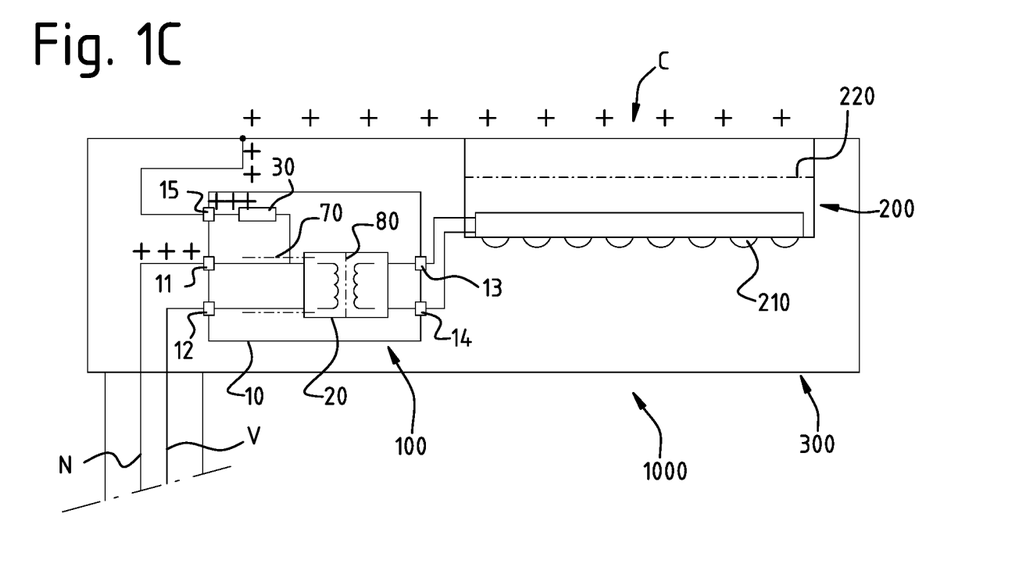

FIG. 1C illustrates schematically that charges C can leak through the resistive circuitry 30 located between the equipotential part of the luminaire housing 300 and the neutral line N, so that the risk of accumulation of charges C over the insulation level of 220 is cancelled or reduced.

The resistive circuitry 30 may comprise one or more resistors and/or one or more other resistive semiconductor components. However, the use of one or more resistors is preferred. Preferably, the resistive circuitry 30 has an equivalent resistance which is between 1MΩ and 100MΩ, preferably between 1.5MΩ and 10MΩ. Preferably, the resistive circuitry has an equivalent resistance value in this range within a predetermined frequency range, wherein the predetermined frequency range may be from 0 Hz to 100 kHz, or even from 0 Hz to 1 GHz. Preferably, the resistive circuitry 30 is configured such that a safe failure mode is secured. For example, the resistive circuitry 30 may be configured such that an open circuit is formed when the resistive circuitry 30 breaks down. Resistors fulfilling this criterion are readily available. If only one resistor is used, there may still be a risk of failure in short-cut. For that reason it may be preferred to use at least two resistors connected in series.

When the equipotential connecting part 15 is connected to the electrically conductive equipotential part of the luminaire housing 300, as shown in FIG. 1C, a resistive path is created between the electrically conductive equipotential part of the luminaire housing 300 and the first power supply input connector element 11 through the resistive circuitry 30. The first power supply input connector element 11 is connected to the neutral line N of the electrical distribution grid G, and the second power supply input connector element 12 is connected to the voltage line V of the electrical distribution grid G. The resistive circuitry 30 allows a current to flow from the equipotential part of the luminaire housing 300 to the neutral line N of the electrical distribution grid G. Thus, when electrostatic charges accumulate on the equipotential part of the luminaire housing 300, those charges can be discharged through the resistive circuitry 30 towards the neutral line N. By including such resistive circuitry 30 in the luminaire driver 100, the need for a connection of the luminaire housing 300 to an earth is avoided. The luminaire housing 300 may be simply connected to the equipotential connecting part 15 during installation of the luminaire driver 100 in or on or near the luminaire head 1000.

Figure 1D:
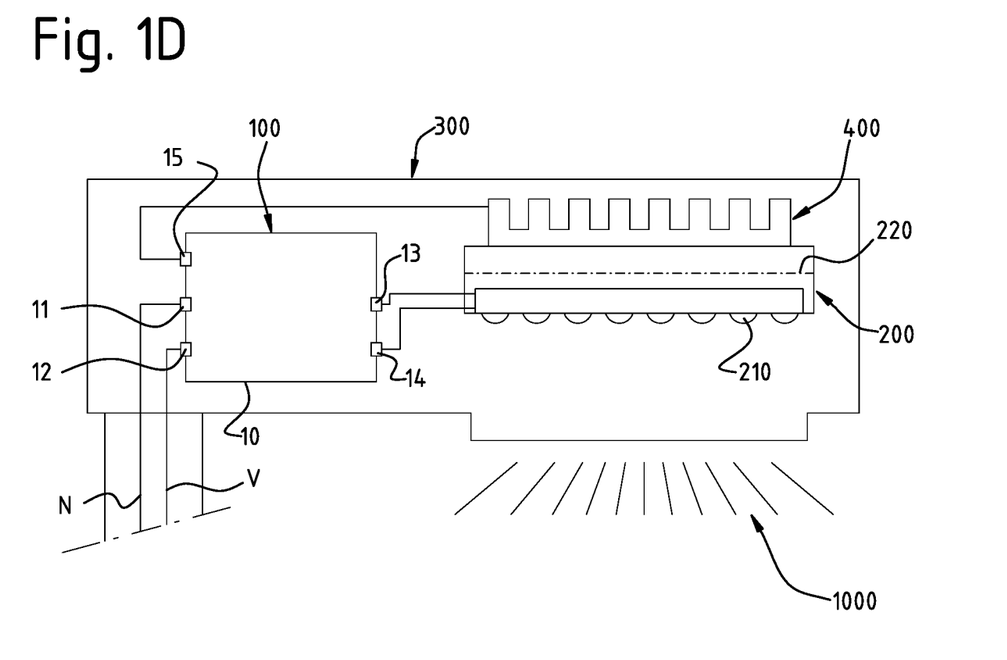
FIG. 1D illustrates a variant of FIG. 1A.

FIG. 1D illustrates a variant of the exemplary embodiment of FIG. 1A, and similar features have been indicated with the same reference numerals. In the embodiment of FIG. 1D, the housing 300 of the luminaire head 1000 is assumed to be non-conductive. The luminaire head 1000 comprises a heat sink 400 configured for dissipating heat generated by the plurality of light sources 210 and/or any other circuitry present. In such an embodiment charges may accumulate on the housing 300, e.g. due to wind flowing along the housing 300, and those charges may pass to the heat sink 400 which is typically arranged in contact with or close to the luminaire housing 300. To limit such an accumulation of charges, the equipotential connecting part 15 of the driver 100 is preferably connected to the heat sink 400.

Figure 3:
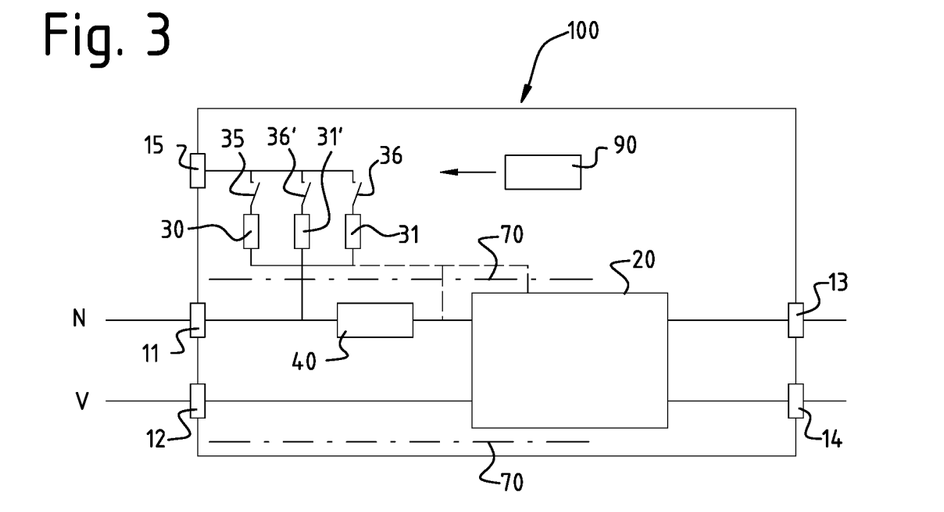
FIG. 3 is a schematic drawing of a second exemplary embodiment of a luminaire driver.

FIG. 3 illustrates a further developed exemplary embodiment of a luminaire driver 100. In the illustrated embodiment, instead of having one resistive circuitry 30, three resistive circuitries 30, 31, 31' are connected in parallel, with respective switching elements 35, 36, 36' in the respective parallel branches. The luminaire driver 100 further comprises a control means 90 configured for controlling the switching elements 35, 36, 36'. The control means 90 may be configured to receive an external control signal, e.g. a wired or wireless signal, and to control the opening or closing of the switching elements 35, 36, 36' accordingly. According to another possible embodiment, the luminaire driver 100 may be provided with one or more further control input connector elements (not shown) connected to the control means 90. These one or more control input connector elements may be connected to other components in a wired manner, for receiving control signals. By controlling the switching elements 35, 36, 36', an operator can control the value of the resistance between the equipotential connecting part 15 and the first power supply input connector element 11. In that manner a suitable resistance value may be set depending on e.g. the luminaire head type, the environment, etc. The skilled person understands that many other resistive circuitries may be implemented with one or more switching elements in order to be able to vary the resistance value between the equipotential connecting part 15 and the first power supply input connector element 11, and that any variants fall within the scope of protection of the invention.

Figure 4:
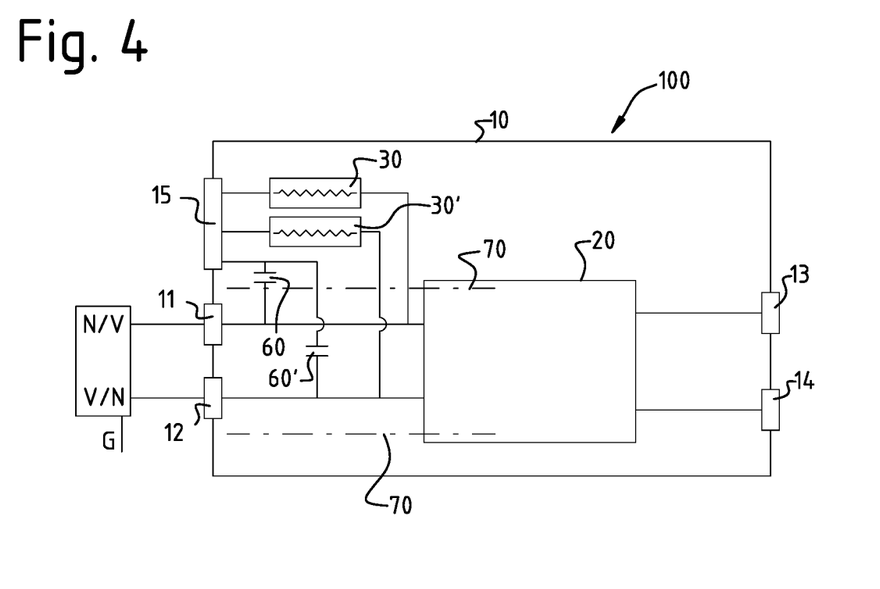
FIG. 4 is a schematic drawing of a third exemplary embodiment of a luminaire driver.

FIG. 4 illustrates an exemplary embodiment of a luminaire driver 100 having first and second power supply input connector elements 11, 12 which can be used interchangeably. In other words, either the first power supply input connector element 11 or the second power supply input connector element 12 may be connected a neutral line N of the electrical distribution grid G. To achieve an electrostatic discharge protection in the two possible power connection situations, an additional resistive circuitry 30' is arranged in the driver housing 10, between the equipotential connecting part 15 and the second power supply input connector element 12. The additional resistive circuitry 30' may be the same or similar to the previously described resistive circuitry 30. In the example of FIG. 4, a leakage current may flow through resistive circuitry 30, 30' as they are connected in series between the neutral line N and the voltage line V of the grid G. This may be avoided by including switching elements in the branches, as in the embodiment of FIG. 3. In a further developed embodiment, the current in resistive circuitry 30, 30' may be sensed to detect if the neutral line N is connected to the first power supply input connector element 11 or to the second power supply input connector element 12 to enable the useful resistive circuitry (i.e. either 30 or 30') and disable the other resistive circuitry, e.g. using switching elements as in the embodiment of FIG. 3.

Further, in the embodiment of FIG. 4, for EMC purposes, a capacitor 60 is arranged inside the driver housing 10. The capacitor 60 is connected between the equipotential connecting part 15 and the first power supply input connector element 11. Similarly, a capacitor 60' is arranged inside the driver housing 10, and connected between the equipotential connecting part 15 and the second power supply input connector element 12.

Figure 5:
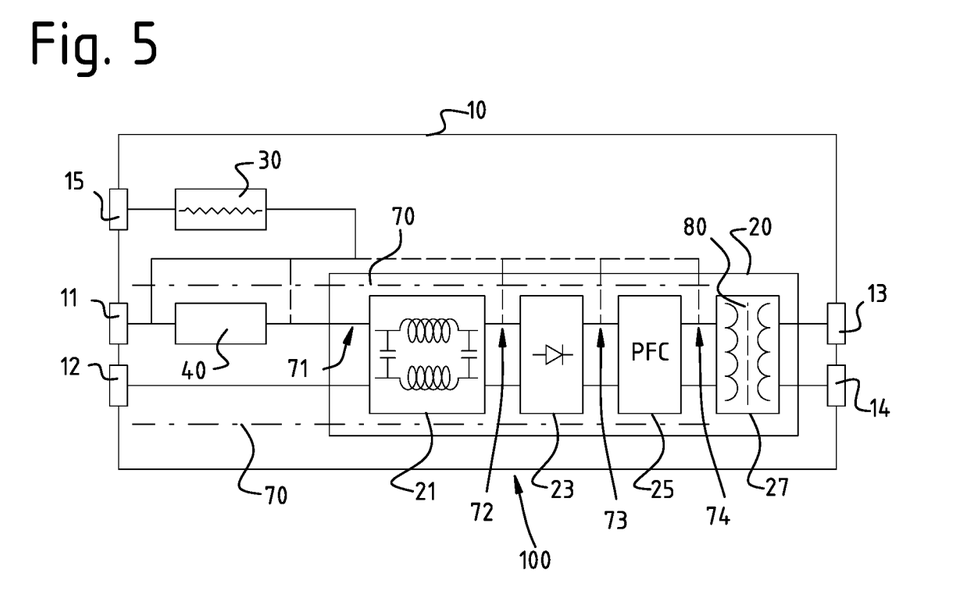
FIG. 5 is a schematic drawing of a fourth exemplary embodiment of a luminaire driver.

FIG. 5 illustrates an exemplary embodiment of a luminaire driver 100 with a driver circuitry 20.

Looking in a downstream direction from the first and second power supply input connector elements 11, 12 towards the output connector elements 13, 14, the driver circuitry 20 comprises an EMC filtering circuitry 21, a rectifier and smoothing circuitry 23, a power factor correction circuitry 25, and an isolated power switching converter circuitry 27.

The EMC filtering circuitry 21 may be designed to filter out high frequency noise generated by the isolated power switching converter circuitry 27. It may also include one or more protective components such as a varistor to filter out electrical transients from the grid G.

The rectifier and smoothing circuitry 23 may include one or more components, such as diodes, transistors, capacitors, and/or resistors, arranged to rectify and/or filter the voltage between the first and second power supply input connector elements 11, 12. The rectifier circuitry 23 may include e.g. a passive diode bridge rectifier. The rectifier circuitry 23 may further include one or more components arranged to smoothen and/or otherwise condition the rectified DC voltage.

The power factor correction circuitry 25 may include a passive component such as inductor and capacitor. It might also include an active component such as transistor or integrated circuit.

The isolated power switching converter circuitry 27 includes a transformer with at least one primary side winding and at least one secondary side winding, with a galvanic insulation 80 between the primary side and the secondary side. The isolated power switching converter circuitry 27 may comprise e.g. a flyback converter, a buck converter, a boost converter, etc.

Optionally the luminaire driver 100 may further comprise dimming circuitry (not shown) configured to be controlled in function of a dimming control signal which may be received in a wireless or wired manner from a control means (not shown) arranged outside of the driver housing 10, and/or possibly even at a remote location.

In a preferred embodiment, the resistive circuitry 30 is connected between the equipotential connecting part 15 and a branch 71 connecting the EMC filtering circuitry 21 to the first power supply input connector element 11. Optionally, this branch 71 may comprise a fuse 40. In alternative embodiments, the resistive circuitry 30 is connected to a branch 72 connecting the EMC filtering circuitry 21 to the rectifier and smoothing circuitry 23, or to a branch 73 connecting the rectifier and smoothing circuitry 23 to the power factor correction circuitry 25, or to a branch 74 connecting the power factor correction circuitry 25 to the isolated power switching converter circuitry 27.

In the embodiments of FIGS. 1-5, the driver housing 10 may be at least partially made of metal. For example, the driver housing 10 may be entirely made of metal. The equipotential connecting part 15 may then be formed by the metal of the driver housing 10. However, in other embodiments it may be preferred to have an equipotential connecting part 15 which is any one of the following: a connection wire, a connector plug, a connector pin, a connector socket, a terminal block, or a combination thereof. Also, when the driver housing 10 is made of an electrical insulator, such an equipotential connecting part 15 may be preferred. The driver circuitry 20 and the resistive circuitry 30 may be provided on a circuit board arranged inside the driver housing 10.

The luminaire housing 300 may be formed as a metal casing with a transparent or translucent cover allowing light emitted by the light module 200 to be emitted out of the luminaire housing 300. The metal part of the luminaire housing 300 is then connected to the equipotential connecting part 15.

In the embodiments of FIGS. 1-5, the driver housing 10 may be provided with an externally accessible receiving means configured for receiving a pluggable module comprising a further circuit, said receiving means being such that the further circuit is connected to the driver circuitry when the pluggable module is plugged in the receiving means. Also, the driver housing 10 may be provided with a least one, preferably externally accessible, connector element connected to the further circuit of the pluggable module, when the module is plugged in the receiving means. Using such pluggable module, the luminaire driver may be provided with an enhanced functionality and/or suitability for a large class of target devices in a flexible manner, whilst avoiding a significant increase of the cost and volume. Such embodiments have been described in detail in patent application PCT/EP2017/065304 filed on 21 Jun. 2017 in the name of the applicant, and published as WO2017220690, which is included here in its entirety by reference.

Figure 6:
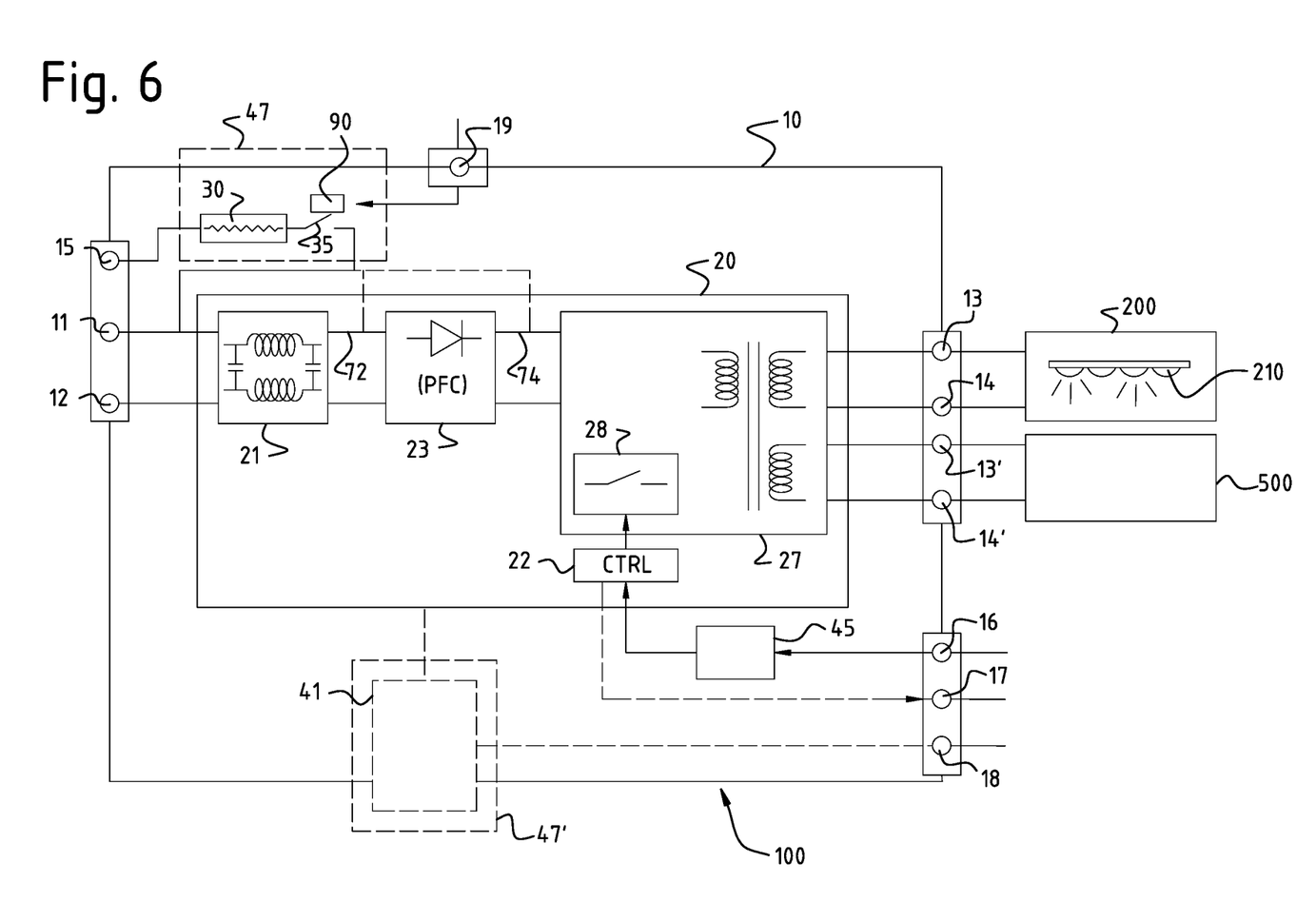
FIG. 6 is a schematic drawing of a further developed embodiment of a luminaire driver.

FIG. 6 illustrates schematically a further developed embodiment of a driver 100 with a driver housing 10 comprising a driver circuitry 20. Looking in a downstream direction from the power supply input connector elements 11, 12 towards the output connector elements 13, 14, 13', 14', the driver circuitry 20 comprises a filtering circuitry 21, a rectifier circuitry 23 with optional smoothing and power factor correction (PFC) circuitry, and a converter circuitry 27. The filtering circuitry 21 and the rectifier circuitry 23 may be configured as described above in connection with FIG. 5. The converter circuitry 27 includes a transformer with at least one primary side winding and at least one secondary side winding, preferably with a galvanic insulation between the primary side and the secondary side. The driver circuitry 20 is configured to drive the at least one light source 210, as well as another component 500 of a luminaire. The converter circuitry 27 may comprise voltage-to-current converter circuitry configured for generating a drive current for the at least one light source 210, as well as other converter circuitry configured for generating a drive current or voltage suitable for driving the other component 500, e.g. a sensor, a camera, a controller, etc.

The driver circuitry 20 may also comprise control circuitry 22 configured for controlling the converter circuitry 21, and in particular one or more switching elements 28 of the converter circuitry 27, in function of a control signal received through a control connector element 16. The control signal may be a light control signal, e.g. a dimming control signal, such as a measured light intensity. The duty cycle and/or the frequency of the switching of the switching element 28 may then be controlled in function of the received control signal to adjust the light emitted by the at least one light source 210 of the light module 200. Additional control connector elements 17, 18 may be provided in order to input or output other control signals. The control connector elements 16, 17, 18 may be integrated in the driver housing 10 and may be accessible from outside of the driver housing 10. Preferably, an isolated feedback component 45, such as an opto-coupler, is provided between the control connector element 16 and the control circuitry 22.

The driver housing 10 may be provided with an externally accessible receiving means configured for receiving a pluggable module 47 comprising a further circuit. Optionally the resistive circuitry 30 may be included in the further circuit of the pluggable module 47, as illustrated in FIG. 6. In other words, the resistive circuitry 30 may be added to the driver 100 via the pluggable module 47.

The receiving means will then be configured such that the resistive circuitry 30 is connected between the equipotential connecting part 15 and the first power supply input connector element 11, either directly or indirectly through branch 72 and/or 74 as explained in connection with FIG. 5.

Optionally, a switching element 35 and a control means 90 for controlling the switching element 35 may be included in the further circuit, wherein the switching element 35 is connected in series with the resistive circuitry 30, between the equipotential connecting part 15 and the first power supply input connector element 11, when the pluggable module is received in the receiving means. Optionally the driver housing 10 may be provided with at least one, preferably externally accessible, control connector element 19 connected to the further circuit of the pluggable module 47, when the pluggable module 47 is plugged in the receiving means, so that a control signal can be communicated to the control means 90 to control the switching element 35. In further developed embodiments the pluggable module 47 may be provided with a combination of resistive circuitries and switching elements as disclosed in connection with FIG. 3 and FIG. 4.

The further circuit may include additional circuitry 41. In FIG. 6 the additional circuitry 41 is shown to be present in a second pluggable module 47', but the skilled person understands that the additional circuitry could also be present in the pluggable module 47 containing the resistive circuitry 30. The additional circuitry 41 may allow the luminaire driver 100 to communicate using one or more protocols such as any one or more of the following: Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), an analogue communication protocol such as an analog 4-20 mA current loop protocol used for electronic signaling. In it also possible to use a wireless protocol, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN), but this is generally not preferred. If a wireless protocol is used the at least one control connector element 18 may be omitted. Also other additional circuitry may be included in the further circuit such as surge protection circuitry. The receiving means may then be provided with a connection interface connecting the driver circuitry via the surge protection circuitry to the first and second supply input connector elements 11, 12, and optionally to the equipotential connecting part 15, when the pluggable module 47 is plugged in the receiving means.

The receiving means for pluggable module 47' may be such that the further circuit 41 is connected to the driver circuitry 20 when the pluggable module 47' is plugged in the receiving means. The further circuit 41 may be powered by the driver circuitry 20, and/or the further circuit 41 may send and/or receive control signals to/from the driver circuitry 20. Optionally the driver housing 10 may be provided with at least one, preferably externally accessible, control input and/or output connector element 18 connected to the further circuit 41 of the pluggable module 47', when the pluggable module 47' is plugged in the receiving means. The at least one externally accessible control input and/or output connector element 18 may then be used to receive and/or send at least one further input and/or output signal using said one or more protocols.

Whilst the principles of the invention have been set out above in connection with specific embodiments, it is to be understood that this description is merely made by way of example and not as a limitation of the scope of protection which is determined by the appended claims.

The invention claimed is:

1. A luminaire driver for driving a light module of a luminaire, said luminaire driver comprising:
   a driver housing comprising:
      a first and second power supply input connector element for connection to an electrical distribution grid; and
      output connector elements for connection to the light module; and
   a driver circuitry arranged inside said driver housing, between said first and second power supply input connector elements and said output connector elements, wherein said driver housing is provided with an equipotential connecting part available at an external surface of said driver housing and intended for being connected to an equipotential part of the luminaire, said luminaire driver further comprising a resistive circuitry arranged inside said driver housing and connected between the equipotential connecting part and the first power supply input connector element.

2. The luminaire driver according to claim 1, wherein the driver circuitry comprises voltage to current converter circuitry.

3. The luminaire driver according to claim 1, wherein the resistive circuitry has an equivalent resistance value between 1 Mega Ohm and 100 Mega Ohm within a frequency range of 0 Hz to 100 kHz or a frequency range of 0 Hz to 1 GHz.

4. The luminaire driver according to claim 1, wherein the resistive circuitry comprises at least one resistor or wherein the resistive circuitry comprises at least two resistors connected in series in a branch between the equipotential connecting part and the first power supply input connector element.

5. The luminaire driver according to claim 1, wherein the driver housing further contains a switching element and a control means for controlling said switching element, and wherein said switching element is connected in series with the resistive circuitry, in a branch between the equipotential connecting part and the first power supply input connector element.

6. The luminaire driver according to claim 5, wherein the control means is configured to receive an external control signal, and to control the opening or closing of the switching element accordingly.

7. The luminaire driver according to claim 5, wherein the driver housing further contains a branch with a second resistive circuitry and a second switching element connected in series with the second resistive circuitry, said branch being connected between the equipotential connecting part and the first power supply input connector element, and wherein the control means is further configured to control said second switching element.

8. The luminaire driver according to claim 1, further comprising a capacitor arranged inside the driver housing and connected to the equipotential connecting part.

9. The luminaire driver according to claim 1, wherein the driver housing is at least partially made of metal and the equipotential connecting part is formed by the metal of the driver housing; or wherein the driver housing is made of plastic and the equipotential connecting part is integrated in the driver housing.

10. The luminaire driver according to claim 1, wherein the equipotential connecting part is any one of the following: a connection wire, a connector plug, a connector pin, a connector socket, a terminal block, or any combination thereof.

11. The luminaire driver according to claim 1, wherein the driver circuitry comprises a rectifier circuitry and a power switching converter circuitry downstream of the rectifier circuitry, when looking from the first and second power supply input connector elements to the output connector elements.

12. The luminaire driver according to claim 11, wherein the resistive circuitry is connected between the equipotential connecting part and a branch connecting the rectifier circuitry to the first power supply input connector element; or wherein the resistive circuitry is connected between the equipotential connecting part and a branch connecting the power switching converter circuitry to the rectifier circuitry.

13. The luminaire driver according to claim 1, wherein an additional resistive circuitry is arranged in the driver housing, between the equipotential connecting part and the second power supply input connector element.

14. The luminaire driver according to claim 1, wherein the driver housing comprises a circuit board, and wherein the driver circuitry and the resistive circuitry are provided on the circuit board.

15. The luminaire driver according to claim 1, wherein the driver housing is provided with an externally accessible receiving means configured for receiving a pluggable module comprising a further circuit, and wherein the resistive circuitry is included in the further circuit, said receiving means being configured such that the resistive circuitry is connected between the equipotential connecting part and the first power supply input connector element, when the pluggable module is plugged in the receiving means.

16. The luminaire driver according to claim 15, wherein the driver housing is provided with a least one connector element connected to the further circuit of the pluggable module, when the module is plugged in the receiving means; and/or wherein the receiving means is configured to receive at least two different types of pluggable modules containing a different further circuit, such that the at least two pluggable modules can be used simultaneously.

17. A luminaire comprising a luminaire housing, a light module arranged in the luminaire housing, and a luminaire driver according to claim 1, wherein the equipotential connecting part is connected to or in contact with an equipotential part of the luminaire, and the light module is connected to the output connector elements.

18. The luminaire according to claim 17, wherein the luminaire driver is arranged in the luminaire housing; and/or wherein the luminaire housing is at least partially made of an electrically conductive material and the equipotential connecting part is connected to or in contact with the electrically conductive material of the luminaire housing; and/or further comprising a heat sink, wherein the equipotential connecting part is connected to or in contact with the heatsink.

19. A luminaire driver for driving a light module of a luminaire; said luminaire driver comprising:
- a driver housing with a first and second power supply input connector element for connection to an electrical distribution grid, and output connector elements for connection to the light module; and
- a driver circuitry arranged inside said driver housing, between said first and second power supply input connector elements and said output connector elements;
- wherein said driver housing is provided with an equipotential connecting part available at an external surface of said driver housing and intended for being connected to an equipotential part of the luminaire;
- said luminaire driver further comprising a resistive circuitry, a switching element and a control means for controlling said switching element, wherein said switching element is connected in series with the resistive circuitry, in a branch between the equipotential connecting part and the first power supply input connector element.

20. A luminaire driver for driving a light module of a luminaire; said luminaire driver comprising:
- a driver housing with a first and second power supply input connector element for connection to an electrical distribution grid, and output connector elements for connection to the light module; and
- a driver circuitry arranged inside said driver housing, between said first and second power supply input connector elements and said output connector elements;
- wherein said driver housing is provided with an equipotential connecting part available at an external surface of said driver housing and intended for being connected to an equipotential part of the luminaire;
- said luminaire driver further comprising a first resistive circuitry connected between the equipotential connecting part and the first power supply input connector element, and a second resistive circuitry connected between the equipotential connecting part and the second power supply input connector element.

* * * * *